United States Patent [19]

Schwarte et al.

[11] Patent Number: 5,502,101
[45] Date of Patent: Mar. 26, 1996

[54] PROCESS FOR THE PRODUCTION OF A MULTICOAT FINISH AND AQUEOUS BASECOATS SUITABLE FOR THIS PROCESS

[75] Inventors: Stephan Schwarte, Emsdetten; Arnold Dobbelstein, deceased, late of Münster, by Hildegard Dobbelstein, Christiane Dobbelstein, legal representatives; Jürgen Niemann, Münster; Walter Lassmann, Münster; Susanne Piontek, Münster; Ulrich Poth, Münster; Klaus Eikelmann, Münster, all of Germany

[73] Assignee: BASF Lacke + Farben, AG, Muenster-Hiltrup, Germany

[21] Appl. No.: 927,309

[22] PCT Filed: Mar. 9, 1991

[86] PCT No.: PCT/EP91/00448

§ 371 Date: Nov. 30, 1992

§ 102(e) Date: Nov. 30, 1992

[87] PCT Pub. No.: WO91/14515

PCT Pub. Date: Oct. 3, 1991

[30] Foreign Application Priority Data

Mar. 28, 1990 [DE] Germany .................... 40 09 857.5

[51] Int. Cl.$^6$ ........................................ C08K 3/20
[52] U.S. Cl. .................. 524/460; 524/458; 524/556; 427/372.2; 427/380; 427/383.7; 427/385.5; 427/388.1; 427/388.2; 427/388.4; 427/407.1
[58] Field of Search .................... 524/556, 458, 524/460; 427/372.2, 280, 283.1, 385.5, 388.1, 388.2, 388.4, 407.1

[56] References Cited

U.S. PATENT DOCUMENTS

| | | | |
|---|---|---|---|
| 4,521,489 | 6/1985 | Rehfuss et al. | 428/412 |
| 4,677,004 | 6/1987 | Das et al. | 427/407.1 |
| 4,730,020 | 3/1988 | Wilfinger et al. | 524/555 |
| 4,798,748 | 1/1989 | Claar et al. | 427/407.1 |
| 4,978,708 | 12/1990 | Fowler et al. | 524/507 |

Primary Examiner—Edward J. Cain
Attorney, Agent, or Firm—Anne Gerry Sabourin

[57] ABSTRACT

The invention relates to basecoats for the production of finishes of the basecoat/clearcoat type which comprise a water-thinnable polyacrylate resin which can be obtained by polymerizing, either successively or in part amounts, monomers containing carboxyl groups and monomers free from carboxyl groups in an organic solvent to form a polyacrylate resin which is neutralized, at least partially, and dispersed in water.

14 Claims, No Drawings

PROCESS FOR THE PRODUCTION OF A MULTICOAT FINISH AND AQUEOUS BASECOATS SUITABLE FOR THIS PROCESS

The invention relates to a process for the production of a multicoat protective and/or decorative finish in which (1) an aqueous pigmented basecoat is applied to the substrate surface as basecoat, (2) a polymer film is formed from the paint applied in stage (1), (3) a transparent topcoat is applied to the basecoat obtained in this way and subsequently (4) the basecoat is baked together with the topcoat.

This process represents the well-known basecoat/clearcoat process which is employed especially in the automotive industry for the production of high-quality finishes, in particular of metallic finishes (cf. for example EP-A-38,127, EP-A-89,497 and DE-A-3,628,124).

The invention also relates to aqueous paints which can be used as basecoats in the above process.

The basecoat/clearcoat process under discussion employs predominantly basecoats which contain exclusively organic solvents as thinners and/or solvents.

The paint industry has striven for ecological and economic reasons to replace as large a part of the organic solvents as possible by water. There is a great demand for aqueous basecoats which can be used in the basecoat/clearcoat process described above. An essential feature of the basecoat/clearcoat process lies in the fact that the transparent topcoat is applied to the basecoat before the latter has been baked, and only then are the basecoat and topcoat baked together (wet-on-wet process).

The object forming the basis of the present invention consists in providing novel aqueous paints which can be used as basecoats in the basecoat/clearcoat process. Surprisingly, this object is achieved by the provision of aqueous pigmented paints comprising a water-thinnable polyacrylate resin which can be obtained by adding, either consecutively or alternately in part amounts, (I)

(a1) 2.5 to 15, preferably 3 to 7% by weight of an ethylenically unsaturated monomer which contains at least one carboxyl group per molecule and is copolymerizable with (b1), (b2), (b3) and (a2), or a mixture of such monomers, together with (a2) 0 to 60, preferably 0 to 28% by weight of an ethylenically unsaturated monomer which is free from carboxyl groups and is copolymerizable with (b1), (b2), (b3) and (a1), or a mixture of such monomers, and a component (b), consisting of (b1) 40 to 90, preferably 40 to 80% by weight of a (meth)acrylic acid ester which is copolymerizable with (b2), (b3), (a1) and (a2) and is essentially free from carboxyl groups, or a mixture of such (meth)acrylic acid esters, and (b2) 0 to 45, preferably 4 to 34% by weight of an ethylenically unsaturated monomer which is copolymerizable with (b1), (b3), (a1) and (a2), contains at least one hydroxyl group per molecule and is essentially free from carboxyl groups, or a mixture of such monomers, and (b3) 0 to 40, preferably 10 to 30% by weight of an ethylenically unsaturated monomer which is copolymerizable with (b1), (b2), (a1) and (a2), is essentially free from carboxyl groups and is different from (b1) and (b2), or a mixture of such monomers, to an organic solvent or solvent mixture and carrying out a polymerization in the presence of at least one polymerization initiator and, (II) at the end of the polymerization, neutralizing, at least partially, the resultant polyacrylate resin and dispersing it in water, the sum of the proportions by weight of (a1), (a2), (b1), (b2) and (b3) always being 100% by weight and the type and amount of (b1), (b2), (b3), (a1) and (a2) being chosen so that the polyacrylate resin has a hydroxyl value of 0 to 200, preferably of 20 to 120, an acid value of 20 to 100, preferably of 25 to 50, and a glass transition temperature ($T_G$) of $-40°$ C. to $+60°$ C., preferably of $-20°$ C. to $+40°$ C.

The water-thinnable polyacrylate resins used according to the invention allow the formulation of basecoats which possess-especially in comparison with known basecoats comprising polyacrylate resins-a higher solids content and a lower tendency to form runs. In addition, the use of the water-thinnable polyacrylate resins according to the invention, especially in polyurethane-containing basecoats, provides stabilization against a fluctuating shearing stress. Compared with the state of the art, a smaller reduction in viscosity, or no reduction at all, occurs especially on exposure to weak shearing forces. This results in improved sedimentation behavior, simpler handling and increased application reliability.

A more detailed description of the preparation of the water-thinnable polyacrylate resins essential to the invention is preceded by an explanation of two of the terms used:

1.) The term "(meth)acrylic acid" is occasionally used as an abbreviation for "methacrylic acid or acrylic acid".

2.) The expression "essentially free from carboxyl groups" is intended to indicate that the components (b1), (b2) and (b3) may have a low carboxyl group content (but no higher than would cause the polyacrylate resin prepared from the components (b1), (b2) and (b3) to have an acid value no higher than 10). It is preferred, however, for the carboxyl group content of the components (b1), (b2) and (b3) to be as low as possible. Components (b1), (b2) and (b3) which are free from carboxyl groups are used particularly preferably.

For the preparation of the polyacrylate resins to be used according to the invention any ethylenically unsaturated monomer which contains at least one carboxyl group per molecule and is copolymerizable with (a2), (b1), (b2) and (b3), or a mixture of such monomers, may be used as the component (a1). Acrylic acid and/or methacrylic acid are preferably used as the component (a1). However, other ethylenically unsaturated acids having up to 6 carbon atoms in the molecule may be used. Examples of such acids are ethacrylic acid, crotonic acid, maleic acid, fumaric acid and itaconic acid. Mono(meth)acryloyloxyethyl succinate and mono(meth)acryloyloxyethyl phthalate may also be used, for example, as the component (a1).

Any ethylenically unsaturated monomer which is copolymerizable with (b1), (b2), (b3) and (a1), or a mixture of such monomers, may be used as the component (a2). Each of the monomers listed in the description of the components (b1), (b2) and (b3) may be used as the component (a2).

Any (meth)acrylic acid ester which is copolymerizable with (b2), (b3), (a1) and (a2) and is essentially free from carboxyl groups, or a mixture of such (meth)acrylic acid esters, may be used as the component (b1). Examples are alkyl acrylates and alkyl methacrylates having up to 20 carbon atoms in the alkyl radical, for example methyl, ethyl, propyl, butyl, hexyl, ethylhexyl, stearyl and lauryl acrylate and methacrylate. Mixtures of alkyl acrylates and/or alkyl methacrylates which contain at least 25% by weight of n-butyl or t-butyl acrylate and/or n-butyl or t-butyl methacrylate are preferably used as the component (b1).

Any ethylenically unsaturated monomer which is copolymerizable with (b1), (b3), (a1) and (a2), contains at least one hydroxyl group per molecule and is essentially free from carboxyl groups, or a mixture of such monomers, may be used as the component (b2). Examples are hydroxyalkyl esters of acrylic acid, methacrylic acid or another $\alpha,\beta$-ethylenically unsaturated carboxylic acid. These esters may be derived from an alkylene glycol, which is esterified with the acid, or they may be obtained by a reaction of the acid with an alkylene oxide. Hydroxyalkyl esters of acrylic acid and methacrylic acid in which the hydroxyalkyl group contains up to 4 carbon atoms, reaction products of cyclic esters, such as $\epsilon$-caprolactone and these hydroxyalkyl esters or mixtures of these hydroxyalkyl esters or $\epsilon$-caprolactone-modified hydroxyalkyl esters are preferably used as the component (b2). Examples of such hydroxyalkyl esters are 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate and 4-hydroxybutyl methacrylate. Corresponding esters of other unsaturated acids, for example ethacrylic acid, crotonic acid and similar acids having up to about 6 carbon atoms per molecule, may likewise be used.

Any ethylenically unsaturated monomer which is copolymerizable with (b1), (b2), (a1) and (a2), is essentially free from carboxyl groups and is different from (b1) and (b2), or a mixture of such monomers, may be used as the component (b3). Vinylaromatic hydrocarbons such as styrene, $\alpha$-alkylstyrene and vinyltoluene are preferably used as the component (b3).

The polyacrylate resins used according to the invention may be prepared by adding 2.5 to 15, preferably 3 to 7% by weight of the component (a1) together with 0 to 60, preferably 0 to 28% by weight of component (a2) to an organic solvent or solvent mixture, carrying out polymerization in this solution in the presence of at least one polymerization initiator and adding, at the end of the addition of the components (a1) and (a2), a component (b) consisting of the components (b1), (b2) and, if appropriate, (b3) to the organic solvent or solvent mixture and carrying out polymerization in this solution in the presence of least one polymerization initiator. The addition of the component (b) should not commence before at least 60% by weight, preferably at least 80% by weight, of the components (a1) and (a2) have reacted. It is preferred not to commence with the addition of the component (b) before the components (a1) and (a2) have essentially completely reacted. At the end of the polymerization the resultant polyacrylate resin is neutralized, at least partially, and dispersed in water. The percentages by weight of (a1), (a2), (b1), (b2) and (b3) always total 100. The type and amount of the components (a1), (a2), (b1), (b2) and (b3) are chosen so that the polyacrylate resin has a hydroxyl value of 0 to 200, preferably of 20 to 120, an acid value of 20 to 100, preferably of 25 to 50, and a glass transition temperature $(T_G)$ of $-40°$ C. to $+60°$ C., preferably of $-20°$ C. to $+40°$ C.

(a1) and (a2) are preferably added to the organic solvent or solvent mixture within 10 to 90 minutes, particularly preferably within 30 to 75 minutes, and polymerization is carried out in this solution in the presence of at least one free radical-forming initiator. The component (b) is preferably added to the organic solvent or solvent mixture within 2 to 8 hours, particularly preferably within 3 to 6 hours, and polymerization is carried out in this solution in the presence of at least one free radical-forming initiator.

The polyacrylate resins to be used according to the invention may also be prepared by adding (a1) and (a2) and the component (b) in part amounts alternately to an organic solvent or solvent mixture and carrying out a polymerization in this solution in the presence of at least one free radical-forming initiator. The part amounts should in each case consist of at least 10% by weight of the total amount to be added of the component (a1) and (a2) or the component (b). The addition of a part amount should not commence before at least 60% by weight, preferably at least 80% by weight, of the preceding part amount have reacted. It is preferred not to commence the addition of a part amount before the preceding part amount has essentially completely reacted. At the end of the polymerization the resultant polyacrylate resin is neutralized, at least partially, and dispersed in water. The percentages by weight of (a1), (a2), (b1), (b2) and (b3) always total 100. The type and amount of the components (a1), (a2), (b1), (b2) and (b3) are chosen such that the polyacrylate resin has a hydroxyl value of to 200, preferably of 20 to 120, an acid value of 20 to 100, preferably of 25 to 50, and a glass transition temperature $(T_G)$ of $-40°$ C. to $+60°$ C., preferably of $-20°$ C. to $°40°$ C.

In a preferred embodiment of this method of preparation a part amount of the component (b) (part amount 1) consisting of 30 to 70% by weight, preferably of 40 to 60% by weight, particularly preferably of 50% by weight of the total amount of the component (b) to be used is added in a first step to the organic solvent or solvent mixture and is polymerized in the presence of at least one free radical-forming initiator. At the end of the addition of the part amount 1, a part amount of the mixture of (a1) and (a2) (part amount 2) consisting of 30 to 70% by weight, preferably of 40 to 60% by weight, particularly preferably of 50% by weight of the total amount of the mixture of (a1) and (a2) to be used is added in a second step to the organic solvent or solvent mixture and is polymerized in the presence of at least one free radical-forming initiator. At the end of the addition of the part amount 2, a part amount of the component (b) (part amount 3) consisting of 30 to 70% by weight, preferably of 40 to 60% by weight, particularly preferably of 50% by weight of the total amount of the component (b) to be used is added in a third step to the organic solvent or solvent mixture and is polymerized in the presence of at least one free radical-forming initiator. At the end of the addition of the part amount 3, a part amount of the mixture of (a1) and (a2) (part amount 4) consisting of 30 to 70% by weight, preferably of 40 to 60% by weight, particularly preferably of 50% by weight of the total amount of the mixture of (a1) and (a2) to be used is added in a fourth step to the organic solvent or solvent mixture and is polymerized in the presence of at least one free radical-forming initiator.

The addition of the part amounts 2, 3 and 4 should not commence before at least 60% by weight, preferably 80% by weight, of each of the preceding part amounts has reacted. It is preferred not to commence the addition of a part amount before the preceding part amount has essentially completely reacted.

At the end of the polymerization the resultant polyacrylate resin is neutralized, at least partially, and dispersed in water. The sum of the proportions by weight of (a1), (a2), (b1), (b2) and (b3) is always 100% by weight. The type and amount of the components (a1), (a2), (b1), (b2) and (b3) are chosen so that the polyacrylate resin has a hydroxyl value of 0 to 200, preferably of 20 to 120, an acid value of 20 to 100, preferably of 25 to 50, and a glass transition temperature $(T_G)$ of $-40°$ C. $+60°$ C., preferably of $-20°$ C. to $+40°$ C.

The addition of the part amounts 1 and 3 preferably takes place within 1 to 4 hours, particularly preferably within 1½ to 3 hours. The addition of the part amounts 2 and 4 is preferably carried out within 5 to 30 minutes, particularly preferably within 7 to 20 minutes.

Solvents and polymerization initiators which are customary for the preparation of polyacrylate resins and suitable for the preparation of aqueous dispersions are used as the organic solvents and polymerization initiators. Examples of usable solvents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol. Examples of usable polymerization initiators are free radical-forming initiators, for example benzoyl peroxide, t-butyl perethylhexanoate, azobisisobutyronitrile and t-butyl perbenzoate. The polymerization is expediently performed at a temperature of 80° to 160° C., preferably of 110° to 160° C. The polymerization is concluded when each of the monomers used has essentially completely reacted.

The type and amount of the components (a1), (a2), (b1), (b2) and (b3) are chosen such that the reaction product has a hydroxyl value of 0 to 200, preferably of 20 to 120, an acid value of 20 to 100, preferably of 25 to 50, and a glass transition temperature ($T_G$) of −40° C. to 60° C., preferably of −20° C. to +40° C.

The glass transition temperatures of polyacrylate resins can be calculated approximately by the following formula:

$$\frac{1}{T_G} = \sum_{n=1}^{n=x} \frac{W_n}{T_{Gn}}$$

$T_G$=glass transition temperature of the polyacrylate resins x=number of the various monomers copolymerized in the polyacrylate resin $W_n$=proportion by weight of the nth monomer $T_{Gn}$=glass transition temperature of the homopolymer obtained from the nth monomer The amount and the rate of addition of the initiator is preferably controlled in such a way that the resultant polyacrylate resin has a number average molecular weight of 2500 to 20,000. It is particularly preferred to commence the initiator addition at the same time as the addition of the polymerizable components (a1), (a2) and (b) and to terminate the addition about a half-hour after the addition of the polymerizable components (a1), (a2) and (b) has terminated. The reaction mixture is then kept at the polymerization temperature long enough (usually about 1½ hours) for all the monomers used to have essentially completely reacted. The term "essentially completely reacted" is intended to mean that 100% by weight of the monomer used has preferably reacted, but that it is also possible for a small residual monomer content of not more than about 0.5% by weight, based on the weight of the reaction mixture, to remain unreacted.

At the end of the polymerization the resultant polyacrylate resin is neutralized, at least partially, and dispersed in water.

Both organic bases as well as inorganic bases may be employed for the neutralization. Primary, secondary and tertiary amines, for example ethylamine, propylamine, dimethylamine, dibutylamine, cyclohexylamine, benzylamine, morpholine, piperidine and triethanolamine, are preferably used. Tertiary amines, in particular dimethylethanolamine, triethylamine, tripropylamine and tributylamine, are particularly preferably used as neutralization agent.

The neutralization reaction is generally carried out by mixing the neutralizing base with the polyacrylate resin. Enough base is preferably added for the pH of the basecoat to be 7–8.5, preferably 7.2 to 7.8.

The partially or fully neutralized polyacrylate resin is then dispersed by addition of water. An aqueous polyacrylate resin dispersion results. If desired, some or all of the organic solvent can be distilled off. The polyacrylate resin dispersions according to the invention comprise polyacrylate resin particles whose average particle size is preferably between 60 and 300 nm (method of measurement: laser light scatter; measuring instrument: Malvern Autosizer 2C).

Aqueous basecoats according to the invention can be produced using the polyacrylate resins described above as binders. However, it is preferred to combine the polyacrylate resins with at least one water-thinnable polyurethane resin and/or at least one water-thinnable polyester resin and/or at least one water-thinnable amino resin as binders. For basecoats which comprise nonmetallic pigments or mixtures of non-metallic pigments only and no metallic pigments, a mixture is used preferably consisting of (A) 10 to 95, preferably 25 to 70% by weight of the water-thinnable polyacrylate resin according to the invention, (B) 5 to 50, preferably 10 to 40% by weight of an amino resin, (C) 0 to 85, preferably 20 to 60% by weight of a water-thinnable polyester resin and (D) 0 to 85, preferably 0 to 40% by weight of a water-thinnable polyurethane resin.

The sum of the proportions by weight of the components (A) to (D) is always 100% by weight.

For basecoats which comprise a metallic pigment or a mixture of metallic pigments, in combination with non-metallic pigments if appropriate, a mixture is used as binder preferably consisting of (A) 0.1 to 60, preferably 1 to 30% by weight of the water-thinnable polyacrylate resin according to the invention, (B) 0 to 50, preferably 5 to 30% by weight of an amino resin, (C) 0 to 50, preferably 15 to 40% by weight of a water-thinnable polyester resin and (D) 10 to 99.9, preferably 20 to 60% by weight of a water-thinnable polyurethane resin.

The percentages by weight of the components (A) to (D) always total 100.

The polyacrylate resins under discussion may be combined, for example, with water-thinnable polyurethane resins which can be prepared by reacting (i) a polyester polyol and/or a polyether polyol having a number average molecular weight of 400 to 5000 or a mixture of such polyester polyols and/or polyether polyols, (ii) a polyisocyanate or a mixture of polyisocyanates, (iii) a compound which contains in the molecule at least one group reactive toward isocyanate groups and at least one group capable of forming anions, or a mixture of such compounds, (iv) an organic compound having a molecular weight of 40 to 600 which may contain hydroxyl and/or amino groups, if appropriate, or a mixture of such compounds, and (v) if appropriate, a compound which contains in the molecule at least one group reactive toward NCO groups and at least one poly(oxyalkylene) group, or a mixture of such compounds,
with each other and neutralizing, at least partially, the resultant product. The polyurethane resin should expediently have an acid value of 10 to 60 and a number average molecular weight of 4000 to 25,000.

The polyurethane resins may be prepared from (i), (ii), (iii), if appropriate (iv) and, if appropriate, (v) by methods of polyurethane chemistry well known to a person skilled in the art (cf. for example U.S. Pat. No. 4,719,132, DE-A-3, 628,124, EP-A-89,497, EP-A-256,540 and WO 87/03829).

Saturated and unsaturated polyester polyols and/or polyether polyols, in particular polyester diols and/or polyether diols having a number average molecular weight of 400 to 5000, may be used as the component (i). Suitable polyether diols are, for example, polyether diols of the general formula $H(-O-(CHR^1)_n-)_mOH$, in which $R^1$ is hydrogen or a lower, unsubstituted or substituted alkyl radical, n is 2 to 6, preferably 3 to 4 and m is 2 to 100, preferably 5 to 50. Suitable examples are linear or branched polyether diols such as poly(oxyethylene) glycols, poly(oxypropylene) glycols and poly(oxybutylene) glycols. The chosen polyether diols should not introduce excessive amounts of ether groups, since otherwise the resultant polymers swell in water. The preferred polyether diols are poly(oxypropylene) glycols in the molecular mass range $M_n$ of 400 to 3000.

Polyester diols are prepared by esterification of organic dicarboxylic acids or their anhydrides with organic diols or they are derived from a hydroxycarboxylic acid or a lactone. To prepare branched polyester polyols, polyols or polycarboxylic acids having a higher valency may be used to a limited extent. The dicarboxylic acids and diols may be linear or branched aliphatic, cycloaliphatic or aromatic dicarboxylic acids or diols.

The diols used for the preparation of the polyesters consist, for example, of alkylene glycols, such as ethylene glycol, propylene glycol, butylene glycol, butane-1,4-diol, hexane-1,6-diol, neopentyl glycol and other diols such as dimethylolcyclohexane. However, small amounts of polyols, such as trimethylolpropane, glycerol and pentaerythritol, may also be added. The acid component of the polyester consists primarily of low-molecular dicarboxylic acids or their anhydrides having 2 to 30, preferably 4 to 18 carbon atoms in the molecule. Examples of suitable acids are o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, provided they exist. In the formation of polyester polyols smaller amounts of carboxylic acids having 3 or more carboxyl groups, for example trimellitic anhydride or the adduct of maleic anhydride to unsaturated fatty acids, may also be present.

Polyester diols which are obtained by reacting a lactone with a diol may also be used. They are distinguished by the presence of terminal hydroxyl groups and recurrent polyester moieties of the formula $(-CO-(CHR^2)_n-CH_2-O)$, in which n is preferably 4 to 6 and the substituent $R^2$ is hydrogen, an alkyl, cycloalkyl or alkoxy radical.

No substituent contains more than 12 carbon atoms. The total number of carbon atoms in the substituent does not exceed 12 per lactone ring. Suitable examples are hydroxycaproic acid, hydroxybutyric acid, hydroxydecanoic acid and/or hydroxystearic acid.

The unsubstituted ε-caprolactone in which n is 4 and all R substituents are hydrogen, is preferred for the preparation of the polyester diols. The reaction with the lactone can be initiated by low-molecular polyols such as ethylene glycol, 1,3-propanediol, 1,4-butanediol and dimethylolcyclohexane. However, other reaction components, such as ethylenediamine, alkyldialkanolamines or even urea can also be reacted with the caprolactone.

Aliphatic and/or cycloaliphatic and/or aromatic polyisocyanates may be used as the component (ii). Examples of aromatic polyisocyanates are phenylene diisocyanate, tolylene diisocyanate, xylylene diisocyanate, biphenylene diisocyanate, naphthylene diisocyanate and diphenylmethane diisocyanate.

On account of their good resistance to ultraviolet light, (cyclo)aliphatic polyisocyanates furnish products having low tendency to yellowing. Examples of these are isophorone diisocyanate, cyclopentylene diisocyanate and hydrogenation products of the aromatic diisocyanates, such as cyclohexylene diisocyanate, methylcyclohexylene diisocyanate and dicyclohexylmethane diisocyanate. Aliphatic diisocyanates are compounds of the formula $$OCN-(CR^3_2)_r-NCO$$

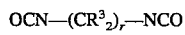

in which r is an integer from 2 to 20, in particular 6 to 8, and $R^3$ which may be the same or different, is hydrogen or a lower alkyl radical having 1 to 8 carbon atoms, preferably 1 or 2 carbon atoms. Examples of these are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate. Isophorone diisocyanate and dicyclohexylmethane diisocyanate are particularly preferred as the diisocyanates.

The composition of the component (ii) must in respect of the functionality of the polyisocyanates be such that no crosslinked polyurethane resin is obtained. In addition to diisocyanates, the component (ii) may also contain a proportion of polyisocyanates having functionalities higher than two, for example triisocyanates.

Products which are formed by trimerization or oligomerization of diisocyanates or by reaction of diisocyanates containing polyfunctional OH or NH groups have been found satisfactory as the triisocyanates. This group of compounds includes, for example, the biuret of hexamethylene diisocyanate and water, the isocyanurate of hexamethylene diisocyanate or the adduct of isophorone diisocyanate to trimethylolpropane. If appropriate, the average functionality may be reduced by the addition of monoisocyanates. Examples of such chain-terminating monoisocyanates are phenyl isocyanate, cyclohexyl isocyanate and stearyl isocyanate.

In order to ensure the water-thinnability of the polyurethane resins used, groups capable of forming anions must be incorporated in the polyurethane molecules. The groups capable of forming anions ensure that after neutralization the polyurethane resin can be dispersed in water to form a stable dispersion. The polyurethane resin should have an acid value of 10 to 60, preferably of 20 to 35. The amount of groups capable of forming anions to be introduced into the polyurethane molecules can be calculated from the acid value.

The introduction into the polyurethane molecules of groups capable of forming anions is carried out by incorporating compounds (iii).

Compounds which contain in the molecule two groups reactive toward isocyanate groups are preferably used as the component (iii). Suitable groups which are reactive toward isocyanate groups are especially hydroxyl groups as well as primary and/or secondary amino groups. Suitable groups which are capable of forming anions are carboxyl, sulfonic acid and/or phosphonic acid groups, carboxyl groups being preferred. Alkanoic acids having two substituents on the α carbon atom may, for example, be used as the component (iii). The substituent may be a hydroxyl group, an alkyl group or preferably an alkylol group. These alkanoic acids have at least one, generally 1 to 3 carboxyl groups in the molecule. They have two to about 25, preferably 3 to 10 carbon atoms. Examples of the component (iii) are dihydroxypropionic acid, dihydroxysuccinic acid and dihydroxybenzoic acid. A particularly preferred group of alkanoic acids are the α,α-dimethylolalkanoic acids of the general formula $R^4$—$C(CH_2OH)2COOH$, $R^4$ being a hydrogen atom or an alkyl group having up to about 20 carbon atoms. Examples of such compounds are 2,2-dimethylolacetic acid, 2,2-dimethylolpropionic acid, 2,2-dimethylolbutyric acid and 2,2-dimethylolpentanoic acid. 2,2-Dimethylolpropionic acid is the preferred dihydroxyalkanoic acid. Examples of compounds containing amino groups are α,β-diaminovaleric acid, 3,4-diaminobenzoic acid, 2,4-diaminotoluenesulfonic acid and 2,4-diaminodiphenyl ether sulfonic acid.

The polyurethane resins used according to the invention may, if appropriate, be prepared using organic compounds having a molecular weight of 40 to 600 and containing hydroxyl and/or amino groups, or a mixture of such compounds (component (iv)). Use of the component (iv) leads to an increased molecular weight of the polyurethane resins. Polyols having up to 20 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, di(trimethylolpropane) ether, pentaerythritol, 1,2-cyclohexanediol, 1,4-cyclohexanedimethanol, bisphenol A, bisphenol F, neopentyl glycol, the neopentyl glycol ester of hydroxypivalic acid, hydroxyethylated or hydroxypropylated bisphenol A, hydrogenated bisphenol A and mixtures thereof may be used, for example, as the component (iv).

The polyols are generally used in amounts of up to 30% by weight, preferably of 2 to 20% by weight, based on the amount used of the components (i) and (iv). Diamines and/or polyamines having primary and/or secondary amino groups may also be used as the component (iv). The polyamines are essentially alkylene polyamines having 1 to 40 carbon atoms, preferably about 2 to 15 carbon atoms. They may contain substituents which have no hydrogen atoms reactive with isocyanate groups. Examples are polyamines with linear or branched aliphatic, cycloaliphatic or aromatic structure and at least two primary amino groups. Suitable diamines are hydrazine, ethylenediamine, propylenediamine, 1,4-butylenediamine, piperazine, 1,4-cyclohexyldimethylamine, 1,6-hexamethylenediamine, trimethylhexamethylenediamine, menthanediamine, isophoronediamine, 4,4'-diaminodicyclohexylmethane and aminoethylethanolamine. Preferred diamines are hydrazine, alkyldiamines or cycloalkyldiamines, such as propylenediamine and 1-amino-3-aminomethyl-2,5,5-trimethylcyclohexane.

Polyamines containing more than two amino groups in the molecule may also be used as the component (iv). However, in such cases care must be taken, for example when monoamines are used at the same time, that no crosslinked polyurethane resins are obtained. Such usable polyamines are diethylenetriamine, triethylenetetramine, dipropylenetriamine and dibutylenetriamine. An example of a monoamine is ethylhexylamine.

Poly(oxyalkylene) groups may be introduced into the polyurethane molecules as non-ionic stabilizing groups with the aid of the components (v). Alkoxypoly(oxyalkylene) alcohols of the general formula R'O—(—$CH_2$—CHR"—O—)$_n$H in which R' is an alkyl radical having 1 to 6 carbon atoms, R" is a hydrogen atom or an alkyl radical having 1 to 6 carbon atoms and n is a number between 20 and 75 may be used, for example, as the component (v).

The preparation of the polyurethane resins which can be used in combination with the polyacrylate resin essential to the invention belongs to the state of the art and is described in detail, for example, in U.S. Pat. No. 4,719,132, DE-A-3, 628,124, EP-A-89,497, EP-A-256,450 and WO 87/03829.

The water-thinnable polyester resins which can be used in combination with the polyacrylate resins according to the invention may be prepared from polycarboxylic acids and polyols by generally well-known methods. Any of the starting materials listed in the description of the component (i) may be used for the preparation of the polyester resins.

The polyester resins which are preferably used as the water-thinnable polyester resins can be obtained by reacting
(α) polyols or a mixture of polyols and
(β) polycarboxylic acids or polycarboxylic anhydrides, or a mixture of polycarboxylic acids and/or polycarboxylic anhydrides, to form a polyester resin having a number average molecular weight of 600 to 5000, preferably of 800 to 2500, an acid value of 20 to 70, preferably of 25 to 55, and a hydroxyl value of 30 to 200, preferably of to 100, in which reaction the components (α) and (β) are used in a molar ratio of 1.15–2.00:1, preferably 1.2–1.5:1, the component (α) consists of 30 to 100 mol% of aliphatic diols containing at least one α carbon atom which is secondary, tertiary or a member of a carbon-containing ring system, and the component (β) consists of 50 to 100 mol % of aromatic and/or cycloaliphatic polycarboxylic acids and of 15 to 40 mol % of tricarboxylic and/or tetracarboxylic acids, the tricarboxylic and/or tetracarboxylic acids being used in such a way that they are incorporated in the polyester resin molecules via at least two carboxyl groups.

The component (α) consists of (α1) 30 to 100, preferably 50 to 100 mol % of aliphatic diols which contain at least one α carbon atom which is secondary, tertiary or a member of a carboncontaining ring system, (α2) 0 to 20, preferably 0 to 10 mol % of aliphatic triols and (α3) 0 to 40, preferably 0 to 20 mol % of diols containing ether groups.

Any aliphatic diol having 4 to 40, preferably 5 to 12 carbon atoms in the molecule, in which at least one α carbon atom is a secondary or tertiary carbon atom or a member of a carbon-containing ring system, may in principle be used as the component (α1). Mixtures of such diols may also be used. Compounds which contain at least one molecular fragment of the general formula —$C(R^1R^2)$—$CH_2OH$, in which $R^1$ and $R^2$ are aliphatic, cycloaliphatic or aromatic hydrocarbon radicals having 1 to 20, preferably 1 to 6 carbon atoms, may be used, for example, as the component (α1). Examples of such compounds are neopentyl glycol, 2-methyl-2-propyl-1,3-propanediol, 2-ethyl-2-butyl-1,3-propanediol, 2-ethyl-2-phenyl-1,3-propanediol, 2,2,4-trimethyl-1,5-pentanediol, 2,2,5-trimethyl-1,6-hexanediol and the neopentyl glycol ester of hydroxypivalic acid. An example of a compound in which at least one α carbon atom is a member of a carbon-containing ring system is dimethylolcyclohexane. Neopentyl glycol, the neopentyl glycol ester of hydroxypivalic acid, dimethylolcyclohexane and 2-ethyl-2-butyl-1,3-propanediol are preferably used as the component (α1).

Glycerol, trimethylolpropane and trimethylolethane may be used, for example, as the component (α2).

Those diols which contain 1 to 10 ether oxygen atoms in the molecule, or mixtures of such compounds, are especially used as the component (α3). Examples of the component (α3) are: diethylene glycol, dipropylene glycol, triethylene glycol, tripropylene glycol, tetraethylene glycol, tetrapropylene glycol as well as poly(ethylene oxide), poly(propylene oxide) and poly(ethylene oxide) (propylene oxide) having number average molecular weights of 400 to 600.

The component (α) consists of (β1) 50 to 100, preferably 50 to 80 mol % of aromatic and/or cycloaliphatic polycarboxylic acids, or mixtures of such polycarboxylic acids, and (β2) 0 to 50, preferably 20 to 50 mol % of aliphatic polycarboxylic acids or mixtures of aliphatic carboxylic acids, the proportion of tricarboxylic or tetracarboxylic acids being 15 to 40 mol %. Reactive carboxylic acid derivatives, such as carboxylic anhydrides, may of course also be used instead of the carboxylic acids.

Any cycloaliphatic or aromatic polycarboxylic acid having 5 to 30, preferably 6 to 18 carbon atoms in the molecule or an anhydride of this polycarboxylic acid or a mixture of these polycarboxylic acids or their anhydrides may in principle be used as the component (β1). Examples of polycarboxylic acids which may be used are isophthalic acid, terephthalic acid, orthophthalic acid, tetrahydrophthalic acid, hexahydrophthalic acid, 1,4-cyclohexanedicarboxylic acid, dicyclopentadienedicarboxylic acid, trimesic acid (benzene-1,3,5-tricarboxylic acid), trimellitic acid, pyromellitic acid and endomethylenetetrahydrophthalic acid as well as their anhydrides. Isophthalic acid, terephthalic acid, orthophthalic acid, tetrahydrophthalic acid, hexahydrophthalic acid, trimellitic acid, pyromellitic acid, their anhydrides or mixtures of these polycarboxylic acids or their anhydrides are preferably used as the component (β1).

Any linear or branched aliphatic polycarboxylic acid having 2 to 40 carbon atoms in the molecule or an anhydride of these polycarboxylic acids or a mixture of these polycarboxylic acids or their anhydrides, may in principle be used as the component (β2). Examples of aliphatic polycarboxylic acids which may be used are oxalic acid, malonic acid, succinic acid, glutaric acid, adipic acid, pimelic acid, suberic acid, azelaic acid, sebacic acid, maleic acid, fumaric acid, polymerized fatty acids and citric acid as well as their anhydrides. Adipic acid, azelaic acid, sebacic acid, succinic acid, their anhydrides or mixtures of these polycarboxylic acids or their anhydrides are preferably used as the component (β2). Polymerized fatty acids, in particular dimerized fatty acids, are very particularly preferably used as the component (β2). When polymerized fatty acids are used as the component (β2), basecoats of particularly good shelf life are obtained.

Polymeric fatty acids are generally prepared by polymerizing fatty acids, for example linolenic, linoleic or oleic acid on their own, in a mixture with each other or in a mixture with saturated fatty acids. The result is a mixture which contains mainly dimeric, but also monomeric and trimeric molecules as well as by-products, depending on the conduct of the reaction. Purification is usually accomplished by distillation. Commercial polymeric fatty acids generally contain at least 80% by weight of dimeric fatty acids, up to 20% by weight of trimeric fatty acids and not more than 1% by weight of monomeric fatty acids. It is preferred to use as the component (β2) polymeric fatty acids which consist of at least 98% by weight of dimeric fatty acids and of not more than 2% by weight of trimeric fatty acids and of not more than traces of monomeric fatty acids.

Polymeric fatty acids contain both cyclic and linear aliphatic molecular fragments. However, in the sense of the present inventions they are considered not as cycloaliphatic but as linear aliphatic polycarboxylic acids and are thus to be included under component (β2).

Trimellitic acid or pyromellitic acid, their mixtures or their anhydrides, are preferably used as the tricarboxylic or tetracarboxylic acids.

The preparation of the water-thinnable polyester resins is carried out by generally well-known methods of polyester chemistry by reacting the components (α) and (β). The reaction temperature should expediently be about 140 to 240, preferably 180° to 220° C. In some cases it may be expedient to catalyze the esterification reaction. Examples of usable catalysts are tetrabutyl titanate, zinc octoate, tin octoate, dibutyltin oxide, organic salts of dibutyltin oxide etc. Care must be taken in the esterification that the tricarboxylic or tetracarboxylic acids are incorporated in the polyester resin molecules in such a way that on statistical average at least two carboxyl groups are esterified.

Ammonia and/or amines (in particular alkylamines), amino alcohols or cyclic amines, such as diethylamine and triethylamine, dimethylaminoethanolamine, diisopropanolamine, morpholine, N-alkylmorpholine etc., may be used for the neutralization of the polyester resins. Highly volatile amines are preferred for the neutralization.

The amino resins which can be used in combination with the polyacrylate resins essential to the invention are supplied by many companies as commercial products (for example Cymel® from American Cyanamid Company, Resimene® from Monsanto Company and Luwipal® from BASF AG). They are usually at least partially etherified condensation products from compounds containing amino groups, in particular melamine or benzoguanaminge, and aldehydes, in particular formaldehyde. The water-thinnability of the amino resins depends generally on the degree of condensation and on the etherification component. The lower the degree of condensation and the shorter the chains of the alkyl groups in the etherification component, the better is the water-thinnability of the amino resins. The water-thinnability of amino resins may also be enhanced by the introduction of carboxyl groups (for example etherification with hydroxycarboxylic acids). In addition, the water-thinnability of amino resins can be enhanced by the addition of water-thinnable solvents, for example glycol ethers.

In addition to the binders described above, the basecoats according to the invention may contain other water-thinnable synthetic resins which are used for the grinding of the pigments and/or as rheology-controlling additives. Examples of such synthetic resins are polyethers, for example polypropylene glycol having a number average molecular weight of 400 to 900, water-soluble cellulose ethers such as hydroxyethylcellulose, methylcellulose or carboxymethylcellulose as well as synthetic polymers containing ionic and/or associatively acting groups, such as polyvinyl alcohol, poly(meth)acrylamide, poly(meth)acrylic acid, polyvinylpyrrolidone, styrenemaleic anhydride or ethylene-maleic anhydride copolymers and their derivatives or else hydrophobically modified ethoxylated urethanes or polyacrylates containing carboxyl groups.

The basecoats according to the invention may also contain crosslinked polymicroparticles, such as those disclosed in EP-A-38,127.

The basecoats according to the invention may also contain inorganic rheology-controlling agents, for example phyllosilicates.

The basecoats according to the invention may also contain as pigments chromophoric inorganic pigments, for example titanium dioxide, iron oxide, carbon black etc., and/or chromophoric organic pigments and/or conventional metallic pigments (for example commercial aluminum bronzes, stainless steel bronzes etc.) and/or non-metallic effect pigments (for example pearlescent pigments or interference pigments). The basecoats according to the invention preferably contain metallic pigments and/or effect pigments. The degree of pigmentation is within the usual ranges.

The basecoats according to the invention generally have a solids content of about 15 to 50% by weight at spray viscosity. The solids content varies with the intended application of the basecoats. For metallic paints it is, for example, preferably 17 to 25% by weight. For solid paints it is higher, for example 30 to 45% by weight.

In addition, the basecoats according to the invention may contain conventional organic solvents. Their content should be kept as low as possible. It is, for example, below 15% by weight.

The pH of the basecoats according to the invention is generally adjusted to between 6.5 and 9.0. The pH can be adjusted with customary amines, for example triethylamine, dimethylaminoethanol and N-methylmorpholine.

The basecoats according to the invention may be employed both in production line finishing and in refinishing. They are preferably used in production line finishing.

Paints based on organic solvents, water-thinnable paints and powder paints may be used as the transparent topcoats. The paints may be used as unpigmented clearcoats or as transparently pigmented paints.

High-quality finishes may be produced with the basecoats according to the invention even without recoating with a transparent topcoat. One-coat finishes are obtained in this way which are distinguished by a particularly high gloss.

The paints according to the invention may be applied to any substrate, for example, metal, wood, plastics or paper.

The invention is explained in greater detail in the examples below.

All parts and percentages are by weight, unless expressly stated otherwise.

A. Preparation of Polyacrylate Resins to be Used According to the Invention 32 parts by weight of butyl glycol are introduced into a steel reaction vessel, fitted with a monomer feed, an initiator feed, a thermometer, oil heating and a reflux condenser and are heated to 110° C.

A solution of 1.56 parts by weight of t-butyl perethylhexanoate in 3.5 parts by weight of butyl glycol is then added at such a rate that the addition is concluded after 1 h 30 min. With the commencement of the addition of the t-butyl perethylhexanoate solution the addition of a mixture of (a1): 5.6 parts by weight of acrylic acid and (a2): 3.1 parts by weight of butyl methacrylate, 1.96 parts by weight of methyl methacrylate and 3.93 parts by weight of lauryl methacrylate and 1.96 parts by weight of styrene is also commenced.

The mixture of (a1) and (a2) is added at such a rate that the addition is concluded after 1 hour.

After the t-butyl perethylhexanoate solution has been added completely, the polymerization temperature is kept for a further 30 min. at 110° C.

A solution of 6.0 parts by weight of t-butyl perethylhexanoate in 6.0 parts by weight of butyl glycol is then added at such a rate that the addition is concluded after 5 h 30 min.

With the commencement of the addition of the t-butyl perethylhexanoate solution the addition of a mixture of (b1): 21.6 parts by weight of n-butyl methacrylate, 20.0 parts by weight of methyl methacrylate and 20.0 parts by weight of lauryl methacrylate, (b2): 20.4 parts by weight of hydroxypropyl acrylate and (b3): 15.0 parts by weight of styrene is also commenced. The mixture of (b1), (b2) and (b3) is added at such a rate that the addition is concluded in 5 hours.

The temperature is kept for a further 1 h 30 min. at 110° C.

The resultant resin solution is concentrated to 80% by weight (solids content) by vacuum distillation and is neutralized with dimethylethanolamine at about 80° C. within about 30 min. to a degree of neutralization of 80%. The resin solution is cooled to 60° C. and the heating is turned off.

Enough water is then added for the solids content of the dispersion to be about 40% by weight.

The resultant dispersion has the following characteristics: acid value 32.8 mg of KOH/g, hydroxyl value: 80, number average molecular weight: 4990, particle size 221 nm[(1)].

[(1)] measured by laser light scatter, measuring instrument: Malvern Autosizer 2C.

A2

35.8 parts by weight of butyl glycol are introduced into a steel reaction vessel fitted with a monomer feed, an initiator feed, a thermometer, oil heating and a reflux condenser and are heated to 110° C. A solution of 3.5 parts by weight of t-butyl perethylhexanoate in 7.0 parts by weight of butyl glycol is then added at such a rate that the addition is concluded after 5 h 30 min. With the commencement of the addition of the t-butyl perethylhexanoate solution the addition of (a1): 5.0 parts by weight of acrylic acid is also commenced. (a1) is added at such a rate that the addition is concluded after 20 min. After (a1) has been added completely, the addition of a mixture of (b1): 22.0 parts by weight of n-butyl acrylate, 20.0 parts by weight of t-butyl acrylate and 15.0 parts by weight of methyl methacrylate, (b2): 23.0 parts by weight of hydroxypropyl acrylate and (b3): 15.0 parts by weight of styrene is commenced. The mixture of (b1), (b2) and (b3) is added at such a rate that the addition is concluded after 4 h 50 min.

After the mixture of (b1), (b2) and (b3) has been added completely, the temperature is kept for a further 1 h 50 min. at 110° C.

The resin solution obtained in this way is cooled to 80° C. and neutralized with dimethylethanolamine at about 80° C. within about 30 min. to a degree of neutralization of 82.5%. The resin solution is cooled to 60° C. and the heating is turned off.

Water is then added slowly until the solids content of the dispersion is about 40% by weight.

The resultant dispersion has the following characteristics: acid value 33.5 mg of KOH/g, hydroxyl value: 100, particle size: 267, solids content (in % by weight, 1 h, 130° C.): 40.0.

B. Preparation of a Polyacrylate Resin Not According to the Invention 35.8 parts by weight of butyl glycol are introduced into a steel reaction vessel fitted with a monomer feed, an initiator feed, a thermometer, oil heating and a reflux condenser and are heated to 110° C. A solution of 3.5 parts by weight of t-butyl perethylhexanoate in 7.0 parts by weight of butyl glycol is then added at such a rate that the addition is concluded after 5 h 30 min. With the commencement of the addition of the t-butyl perethylhexanoate solution the addition of a mixture of 22.0 parts by weight of n-butyl acrylate, 20.0 parts by weight of t-butyl acrylate, 15.0 parts by weight of methyl methacrylate, 15.0 parts by weight of styrene, 23.0 parts by weight of hydroxypropyl acrylate and 5.0 parts by weight of acrylic acid is commenced.

The mixture of monomers is added at such a rate that the addition is concluded after 5 h 10 min.

Further procedure follows that of A 2.

The resultant dispersion has the following characteristics: acid value: 39.0 mg of KOH/g, hydroxyl value: 100, solids content (in % by weight, 1 h, 130° C.): 40.0.

C. Preparation of an Aqueous Polyurethane Resin Dispersion 569 parts by weight of a condensation product (number average molecular weight: 1460) obtained from 1 mol of a polymeric fatty acid (dimer content not less than 98% by weight, trimer content not more than 2% by weight, monomer content not more than traces), 1 mol of isophthalic acid and 2.626 mol of hexanediol, 46 parts by weight of dimethylolpropionic acid, 7 parts by weight of neopentyl glycol, 420 parts by weight of methyl ethyl ketone and 213 parts by weight of isophorone diisocyanate are heated in a temperature-controllable reaction vessel fitted with a stirrer and a water separator in an atmosphere of nitrogen at 80° C. The reaction is continued to an NCO content of 1.0% by weight, based on the total composition. 24 parts by weight of trimethylolpropane are then added and the mixture is stirred at 80° C. until no more isocyanate groups are detectable.

25.8 parts by weight of dimethylethanolamine are then added slowly and 2552 parts by weight of deionized water are then stirred in. The methyl ethyl ketone is distilled off under vacuum.

A fine dispersion is obtained having a pH of 7.8, a non-volatile content of 27% by weight and an acid value of 25 mg of KOH/g.

D. Preparation of an Aqueous Polyester Resin Dispersion 729 parts by weight of neopentyl glycol, 827 parts by weight of hexanediol, 462 parts by weight of hexahydrophthalic anhydride and 1710 parts by weight of a polymeric fatty acid (dimer content not less than 98% by weight, trimer content not more than 2% by weight, monomer content not more than traces) are weighed into a reaction vessel fitted with a stirrer, a thermometer and a packed column and melted. The heating is controlled with stirring in such a way that the temperature at the head of the column does not exceed 100° C. Esterification takes place at 220° C. max. until an acid value of 8.5 is reached. The reaction mixture is cooled to 180° C., 768 parts by weight of trimellitic anhydride are added and esterification is continued until an acid value of 30 is reached. The mixture is then cooled to 120° C. and brought into solution with 1410 parts by weight of butanol. After the solution has cooled to 90° C., 16.2 parts by weight of dimethylethanolamine and then 1248 parts by weight of deionized water are stirred in. A fine dispersion is obtained having a pH of 7.8, a non-volatile content of 60% by weight and an acid value of 30 mg of KOH/g.

E. Production of an Aqueous Metallic Basecoat (comparison example)

33.5 parts by weight of a thickener (paste of a sodium/magnesiumphyllosilicate*, 3% in water) are introduced into the reaction vessel.

* Lapoite RD

A solution of 4.3 parts by weight of butyl glycol and 6.0 parts by weight of a 90% solution of a commercial water-thinnable melamine-formaldehyde resin in isobutanol (Cymel 327®[1]) is added with stirring. 33.3 parts by weight of the polyurethane resin dispersion according to C and 0.4 parts by weight of dimethylethanolamine solution (10% in $H_2O$) are then added to this mixture with stirring. An aluminum pigment suspension is prepared separately as follows: 4.4 parts by weight of a commercial chromated aluminum paste (65% in petroleum spirit/solvent naphtha/butyl glycol, average particle diameter: 15 μm) are homogenized with the addition of 4 parts by weight of butyl glycol. 6.4 parts by weight of the water-soluble polyester resin according to D and 1.0 part by weight of polypropylene glycol (number average molecular weight: 900) are then added to this suspension. This aluminum pigment suspension is stirred into the mixture described above. 6.7 parts by weight of deionized water are then added and the pH is adjusted to 7.65–7.85 with dimethylethanolamine solution (10% in water).

®[1] commercial product from American Cyanamid Company

F. Production of An Aqueous Metallic Basecoat According to the Invention 33.5 parts by weight of a thickener (paste of a sodium/magnesium phyllosilicate*, 3% in water) are introduced into the reaction vessel.

* Laponite RD

A solution of 4.3 parts by weight of butyl glycol and 6.0 parts by weight of a 90% solution of a commercial water-thinnable melamine-formaldehyde resin in isobutanol (Cymel 327® ) is added with stirring. 33.3 parts by weight of the polyurethane resin dispersion according to C, 0.4 parts by weight of dimethylethanolamine solution (10% in water) and 4.8 parts by weight of the polyacrylate resin dispersion according to A 1 are then successively added with stirring. An aluminumpigment suspension is prepared separately as follows: 4.4 parts by weight of a commercial chromated aluminum paste (65% in petroleum spirit/solvent naphtha/butyl glycol, average particle diameter: 15 μm) are homogenized with the addition of 4 parts by weight of butyl glycol. 3.2 parts by weight of the water-soluble polyester resin according to D and 1.0 part by weight of polypropylene glycol (number average molecular weight: 900) are then added to this suspension. This aluminum pigment suspension is stirred into the mixture described above. 3.8 parts by weight of deionized water are then added and the pH is adjusted to 7.65–7.85 with dimethylethanolamine solution (10% in water).

G. Application and Testing of the Aqueous Metallic Basecoats

The aqueous metallic basecoats produced according to E and F are adjusted with distilled water to an application solids content of 24.2% by weight and are applied to a phosphated steel panel coated with a commercial electro-deposition primer and a commercial body filler in such a way that a dry film thickness of 12–15 βm is obtained. The applied basecoats are dried for 10 minutes at room temperature and 10 minutes at 80° C. in a circulating air oven. A commercial two-coat clearcoat based on polyacrylate/polyisocyanate is then applied, the coating is then briefly flashed off and baked for 20 minutes at 140° C. in a circulating air oven.

Test results:

|  | Basecoat according to E | Basecoat according to F |
|---|---|---|
| L 25° (1) | 101.7 | 102.2 |
| L 70° (1) | 40.4 | 40.9 |
| Gloss (2) | 83 | 84 |
| DOI (3) | 92 | 92 |
| Crosshatch test (4) | 0 | 0 |
| Gloss after humidity test (5) | 81 | 81 |
| Crosshatch test after humidity test | 1 | 1 |
| DOI after humidity test | 91 | 91 |

(1) Color content L* according to DIN 6174, determined using a Zeiss goniospectrophotometer.
(2) Degree of gloss according to DIN 67530, angle of 20°
(3) Distinctness of Reflected Image: With the surface to be assessed illuminated at an angle of 30°, the direct reflection is measured at an angle of incidence of −30° and in the immediate proximity of the angle of incidence at −30° ± 0.3°. The DOI value determined therefrom corresponds to the visually perceived sharpness of the mirror image of an object located on this surface. The DOI value is also referred to as image sharpness value. Rating: 100 best value, 0 worst value.
(4) Test according to DIN 53151 including the Tesa peel-off test.
(5) Humidity test at 40° C. for 240 hours (according to DIN 50017)

Test of the Viscosity Stability Under Shearing Stress

To test the viscosity stability under shearing stress, clearcoat media (clearcoat medium=basecoat without pigments) of the basecoats from E and F were vigorously stirred for 1 hour using a paddle stirrer, and then sheared in a viscometer at a shear gradient of 0 to 50 s$^{-1}$ and the viscosities are measured. The clearcoat medium from the basecoat from E exhibited a viscosity drop of about 40%. On the other hand, the clearcoat 10 medium from the basecoat from F exhibited a viscosity drop of less than 10%. This low viscosity drop has no negative effect on the application characteristics and sedimentation behavior.

H. Production of a Pigment Paste for Aqueous Solid-Color Basecoats 10 parts by weight of a thickener (paste of a sodium/magnesiumphyllosilicate, 3% in water) are introduced into the reaction vessel. 4.5 parts by weight of dimethylethanolamine solution (10% in water), 2 parts by weight of polypropylene glycol (molecular weight 900), 46.70 parts by weight of the polyester resin according to D and 23.35 parts by weight of deionized water are added with stirring. The following pigments are then added individually and stirred in: 2.65 parts by weight of Irgazin Red DPP BO®[1], 4.38 parts by weight of Cromophthal Red A2B®[1], 5.29 parts by weight of Novoperm Orange H2 70®[2] and 1.13 parts by weight of Sicotan Yellow 2 1912®[3]. Finally the mixture is homogenized for 20 minutes below [sic] a conventional laboratory dissolver.
®[1] commercial product from Ciba Geigy
®[2] commerical product from Hoechst AG
®[3] commerical product from BAS AG The mixture is then ground in a conventional laboratory bead mill to a Hegmann particle size (ISO 152) of ≤5 μm.

The pH of the pigment paste should be between 8–8.5; otherwise it is adjusted to this value with a dimethylethanolamine solution (10% in water).

I. Production of Aqueous Solid-Color Basecoats

Using the pigment paste and the components listed below, two solid-color basecoats are produced, the solid-color basecoat 2 being a comparison example. In both basecoats the pigments to solid resin weight ratio and the weight ratio of OH-containing solid resin to melamine-formaldehyde resin are the same.

|  | Solid-color basecoat 1 | Solid-color basecoat 2 |
|---|---|---|
| Pigment paste: | 41.33 | 33.57 |
| Polyacrylate resin according to A 2 | 25.77 | — |
| Polyacrylate resin according to B | — | 20.90 |
| Luwipal LR 8789 | 5.88 | 4.77 |
| Resimene 4518 | 0.92 | 0.75 |
| Deionized water | 26.10 | 40.01 |

The above components are mixed successively with stirring. The numerical data are parts by weight. The viscosity of the resultant basecoats is adjusted to 28 s (DIN 4). Solid-color basecoat 1 has at this viscosity a solids content of 35% by weight (1 h, 130° C.) and solid-color basecoat 2 a solids content of 28.3% by weight (1 h, 130° C.).

J. Application and Testing of the Solid-Color Basecoats

The aqueous solid-color basecoats produced according to I. are stored for 48 hours and then applied to phosphated steel panels coated with a commercial electrodeposition primer and a commercial body filler by the following procedure: pneumatic spray application at a relative atmospheric humidity of 60% and a temperature of 23° C., using a pressure vessel, two-pass application with a flash-off time of 2 minutes after the first application, a flash-off time of 1 minute after the second application and 10 minutes drying in a circulating air oven. A commercial clearcoat based on polyacrylate/melamine-formaldehyde resin is then applied, followed by a brief flash-off time and baking for 30 minutes at 130° C.

The testing of the two-coat coating obtained in this way furnished the following results:

|  | Two-coat coating comprising solid-color basecoat 1 | Two-coat coating comprising solid-color basecoat 2 |
|---|---|---|
| Stone-chip resistance according to VDA[1] | 2 | 2–3 |
| Crosshatch test | 0 | 0 |
| Gloss at 20° | 87 | 87 |
| Blister limit[2] | 45 μm | 28 μm |
| Run limit[3] | 45 μm | 24 μm |

[1]VDA: Verband der deutschen Automobilindustrie; blasting medium: 1000 g of beveled shot; particle size: 4–5 mm; pressure: 1.5 bar; VDA stone-impact resistance tester 508
[2]Application by the method described; basecoat film thicknesses at which blisters appear
[3]Application by the method described; basecoat film thicknesses at which runs appear in the basecoat when applied to vertical perforated panels and subsequent preliminary drying.

We claim:
1. A process for the production of a multicoat protective and/or decorative finish in which

(1) an aqueous pigmented basecoat is applied to the substrate surface as basecoat, (2) a polymer film is formed from the coating applied in stage (1), (3) a transparent topcoat is applied to the basecoat obtained in this way and subsequently (4) the basecoat is baked together with the topcoat, wherein the basecoat comprises a water-dispersible polyacrylate resin which is obtained by (I) solution polymerization of components (a) and (b), in an organic solvent or solvent mixture., in the presence of at least one polymerization initiator, wherein components (a) and (b) are polymerized sequentially and wherein component (a) includes (a1) 2.5 to 15, preferably 3 to 7% by weight of an ethylenically unsaturated monomer which contains at least one carboxyl group per molecule and is copolymerizable with (b1), (b2), (b3) and (a2), or a mixture of such monomers, together with (a2) 0 to 60, preferably 0 to 28% by weight of an ethylenically unsaturated monomer which is free from carboxyl groups and is copolymerizable with (b1), (b2), (b3) and (a1), or a mixture of such monomers, and component (b), includes (b1) 40 to 90, preferably 40 to 80% by weight of a (meth)acrylic acid ester which is copolymerizable with (b2), (b3), (a1) and (a2) and is essentially free from carboxyl groups, or a mixture of such (meth)acrylic acid esters and (b2) 0 to 45, preferably 4 to 34% by weight of an ethylenically unsaturated monomer which is copolymerizable with (b1), (b3), (a1) and (a2), contains at least one hydroxyl group per molecule and is essentially free from carboxyl groups, or a mixture of such monomers, and (b3) 0 to 40, preferably 10 to 30% by weight of an ethylenically unsaturated monomer which is copolymerizable with (b1), (b2), (a1) and (a2), is essentially free from carboxyl groups and is different from (b1) and (b2), or a mixture of such monomers, and (II) at the end of the polymerization neutralizing the resultant polyacrylate resin at least partially and dispersing it in water, the sum of the proportions by weight of (a1), (a2), (b1), (b2) and (b3) always being 100% by weight, and the type and amount of (b1), (b2), (b3), (a1) and (a2) being chosen so that the polyacrylate resin has a hydroxyl value of 0 to 200, preferably of 20 to 120, an acid value of 20 to 100, preferably of 25 to 50, and a glass transition temperature ($T_G$) of –40° C. to +60° C., preferably of –20° C. to +40° C.

2. The process as claimed in claim 1, wherein the basecoat further comprises a metallic pigment or a mixture of metallic pigments.

3. The process as claimed in claim 1, wherein the basecoat or the paint comprises, in addition to the water-thinnable polyacrylate resin, a water-thinnable polyurethane resin and/or a water-thinnable polyester resin and/or a water-thinnable amino resin.

4. The process as claimed in claim 1, wherein the basecoat or the paint comprises a non-metallic pigment or a mixture of non-metallic pigments and a mixture of (A) 10 to 95, preferably 25 to 70% by weight of the water-thinnable polyacrylate resin, (B) 5 to 50, preferably 10 to 40% by weight of an amino resin, (C) 0 to 85, preferably 20 to 60% by weight of a water-thinnable polyester resin and (D) 0 to 85, preferably 0 to 40% by weight of a water-thinnable polyurethane resin, the percentages by weight of the components (A) to (D) always totalling 100.

5. The process as claimed in claim 10, wherein the basecoat comprises a metallic pigment and a mixture of (A) 0.1 to 60, preferably 1 to 30% by weight of the water-thinnable thinnable polyacrylate resin, (B) 0 to 50, preferably 5 to 30% by weight of an amino resin, (C) 0 to 50, preferably 15 to 40% by weight of a water-thinnable polyester resin and (D) 10 to 99.9, preferably 20 to 60% by weight of a water-thinnable polyurethane resin, the percentages by weight of the components (A) to (D) always totalling 100.

6. The process as claimed in claim 1, wherein the water-thinnable polyester resin is obtained by reacting (α) polyols or a mixture of polyols and (β) polycarboxylic acids or polycarboxylic anhydrides, or a mixture of polycarboxylic acids and/or polycarboxylic anhydrides, to form a polyester resin having a number average molecular weight of 600 to 5000, preferably of 800 to 2500, an acid value of 20 to 70, preferably of 25 to 55, and a hydroxyl value of 30 to 200, preferably of 45 to 100, and the resultant polyester resin is neutralized, at least partially, in which reaction the components (α) and (β) are used in a molar ratio of 1.15–2.00:1, preferably 1.2–1.5:1, the component (α) comprises 30 to 100 mol % of aliphatic diols containing at least one carbon atom which is secondary, tertiary or a member of a carbon-containing ring system, and the component (β) comprises 50 to 100 mol % of aromatic and/or cycloaliphatic polycarboxylic acids and of 15 to 40 mol % of tricarboxylic and/or tetracarboxylic acids, the tricarboxylic and/or tetracarboxylic acids being used in such a way that they are incorporated in a statistical average in the polyester resin molecules via at least two carboxyl groups.

7. The process as claimed in claim 6, wherein the component (β) comprises 50 to 80 mol % of aromatic and/or cycloaliphatic polycarboxylic acids and of 20 to 50 mol % of one or more polymeric fatty acids, polymeric fatty acids not being considered as cycloaliphatic polycarboxylic acids.

8. An aqueous pigmented paint, comprising a water-dispersible polyacrylate resin which is obtained by (I) solution polymerization of components (a) and (b), in an organic solvent or solvent mixture, in the presence of at least one polymerization initiator, wherein components (a) and (b) are polymerized sequentially, and wherein component (a) includes (1) 2.5 to 15, preferably 3 to 7% by weight of an ethylenically unsaturated monomer which contains at least one carboxyl group per molecule and is copolymerizable with (b1), (b2), (b3) and (a2), or a mixture of such monomers, together with (a2) 0 to 60, preferably 0 to 28% by weight of an ethylenically unsaturated monomer which is free from carboxyl groups and is copolymerizable with (b1), (b2), (b3) and (a1), or a mixture of such monomers, and component (b), includes (b1) 40 to 90, preferably 40 to 80% by weight of a (meth)acrylic acid ester which is copolymerizable with (b2), (b3), (a1) and (a2) and is essentially free from carboxyl groups, or a mixture of such (meth)acrylic acid esters and (b2) 0 to 45, preferably 4 to 34% by weight of an ethylenically unsaturated monomer which is copolymerizable with (b1), (b3), (a1) and (a2), contains at least one hydroxyl group per molecule and is essentially free from carboxyl groups, or a mixture of such monomers, and (b3) 0 to 40, preferably 10 to 30% by weight of an ethylenically unsaturated monomer which is copolymerizable with (b1), (b2), (a1) and (a2), is essentially free from carboxyl groups and is different from (b1) and (b2), or a mixture of such monomers, (II) at the end of the polymerization neutralizing the resultant polyacrylate resin at least partially and dispersing it in water, the sum of the proportions by weight of (a1), a2), (b1), (b2) and (b3) always being 100% by weight, and the type and amount of (b1), (b2), (b3), (a1) and (a2) being chosen so that the polyacrylate resin has a hydroxyl value of 0 to 200, preferably of 20 to 120, an acid value of 20 to 100, preferably of 25 to 50, and a glass transition temperature ($T_G$) of −40° C. to +60° C., preferably of −20° C. to +40° C.

9. The paint as claimed in claim 8, wherein the paint contains a metallic pigment or a mixture of metallic pigments.

10. The paint as claimed in claims 8, wherein the paint comprises, in addition to the water-thinnable polyacrylate resin, a water-thinnable polyurethane resin and/or a water-thinnable polyester resin and/or a water-thinnable amino resin.

11. The paint as claimed in claim 8, wherein the basecoat or the paint comprises a non-metallic pigment or a mixture of non-metallic pigments and a mixture of (A) 10 to 95, preferably 25 to 70% by weight of the water-thinnable polyacrylate resin, (B) 5 to 50, preferably 10 to 40% by weight of an amino resin, (C) 0 to 85, preferably 20 to 60% by weight of a water-thinnable polyester resin and (D) 0 to 85, preferably 0 to 40% by weight of a water-thinnable polyurethane resin, the percentages by weight of the components (A) to (D) always totalling 100.

12. The paint as claimed in claim 8, wherein the paint comprises a metallic pigment and a mixture of (A) 0.1 to 60, preferably 1 to 30% by weight of the water-thinnable polyacrylate resin, (B) 0 to 50, preferably 5 to 30% by weight of an amino resin, (C) 0 to 50, preferably 15 to 40% by weight of a water-thinnable polyester resin and (D) 10 to 99.9, preferably 20 to 60% by weight of a water-thinnable polyurethane resin, the percentages by weight of the components (A) to (D) always totalling 100.

13. The paint as claimed in claim 10, wherein the water-thinnable polyester resin can be obtained by reacting ($\alpha$) polyols or a mixture of polyols and ($\beta$) polycarboxylic acids or polycarboxylic anhydrides, or a mixture of polycarboxylic acids and/or polycarboxylic anhydrides, to form a polyester resin having a number average molecular weight of 600 to 5000, preferably of 800 to 2500, an acid value of 20 to 70, preferably of 25 to 55, and a hydroxyl value of 30 to 200, preferably of 45 to 100, and the resultant polyester resin is neutralized, at least partially, in which reaction the components ($\alpha$) and ($\beta$) are used in a molar ratio of 1.15–2.00:1, preferably 1.2–1.5:1, the component ($\alpha$) comprises 30 to 100 mol % of aliphatic diols containing at least one carbon atom which is secondary, tertiary or a member of a carbon-containing ring system, and the component ($\beta$) comprises 50 to 100 mol % of aromatic and/or cycloaliphatic polycarboxylic acids and of 15 to 40 mol % of tricarboxylic and/or tetracarboxylic acids, the tricarboxylic and/or tetracarboxylic acids being used in such a way that they are incorporated in a statistical average in the polyester resin molecules via at least two carboxyl groups.

14. The paint as claimed in claim 12, wherein the component ($\beta$) comprises 50 to 80 mol % of aromatic and/or cycloaliphatic polycarboxylic acids and of 20 to 50 mol % of one or more polymeric fatty acids, polymeric fatty acids not being considered as cycloaliphatic polycarboxylic acids.

* * * * *